United States Patent [19]

Tobinaga

[11] 4,352,914

[45] Oct. 5, 1982

[54] BINDER COMPOSITION FOR FOUNDRY SAND MOLDS AND CORES

[75] Inventor: Takeshi Tobinaga, Yokkaichi, Japan

[73] Assignee: Mitsubishi Petrochemical Company Limited, Tokyo, Japan

[21] Appl. No.: 308,236

[22] Filed: Oct. 2, 1981

[30] Foreign Application Priority Data

Oct. 6, 1980 [JP] Japan .................................. 55-139530
Oct. 6, 1980 [JP] Japan .................................. 55-139531
Jun. 16, 1981 [JP] Japan .................................. 56-92423
Jun. 16, 1981 [JP] Japan .................................. 56-92424

[51] Int. Cl.$^3$ ...................... C08G 18/64; C08G 18/54
[52] U.S. Cl. ..................................... 525/504; 525/521
[58] Field of Search .................................. 525/504, 521

[56] References Cited

U.S. PATENT DOCUMENTS 3,409,579 11/1968 Robins ................................. 525/504
3,676,392 7/1972 Robins ................................. 528/139
3,702,316 11/1972 Robins ................................. 525/504
3,726,867 4/1973 Robins ................................. 525/504

*Primary Examiner*—Maurice J. Welsh
*Attorney, Agent, or Firm*—Oblon, Fisher, Spivak, McClelland & Maier

[57] ABSTRACT

A novel binder composition for foundry sand molds or cores comprises (a) an organic polyisocyanate compound and (b) a certain polyol compound selected from a formaldehyde-modified bisphenol and a formaldehyde-modified cyclic ketone, or a partially alkoxylated derivative of the polyol compound, the ratio of the component (a) to the component (b) being in the specific range.

11 Claims, No Drawings

BINDER COMPOSITION FOR FOUNDRY SAND MOLDS AND CORES

BACKGROUND OF THE INVENTION

This invention relates to binder compositions for foundry sand molds and cores which are used for nobake process or cold box process in which curing is done by contact with an amine-containing gas.

In foundry industries, binder compositions for foundry sands are very useful for making sand molds and cores.

The binders which have been hitherto used for making foundry sand molds and cores include inorganic and organic binders, which have both merits and demerits. Fully satisfactory binders have so far not been found.

The method for making foundry sand molds and cores with inorganic binders is represented by the method which comprises making sand molds and cores from the sand on which water glass has been deposited and then passing carbon dioxide therethrough to set the molds.

This method, however, has poor shakeout characteristic of cores when castings are taken out after pouring molten iron or aluminum into the sand molds to form the castings, which results in lower production speed.

Other problems encountered in the method are that the foundry sands cannot be reused, that the used sands cannot be readily disposed of because of environmental alkali pollution, that it is difficult to obtain castings having beautiful casting surface because of defects due to gas during casting, and others.

The method for making foundry sand molds and cores with organic binders is represented by the method using furan resins or phenolic resins.

When the sand molds and cores are made by curing furan resin or resol-type phenolic resin with a strong acid such as paratoluene sulfonic acid or phosphoric acid, the curing velocity fluctuates markedly with the ambient temperature.

The method for setting sand molds and cores by the reaction of phenolic resins with organic isocyanate compounds is also used widely as the Ashland method (e.g., U.S. Pat. Nos. 3,409,579; 3,676,392; 3,702,316 and 3,726,867). As far as I am aware, however, the shakeout characteristic of the foundry sand cores in this method is also not satisfactory when castings are taken out of the sand or metal molds. Especially when castings have complicated core configurations such as cylinder heads and intake manifolds are made from light alloy materials, the post-treatment step of stripping off core sands requires much labor since the core sands do not easily come out. Also in the shell-mold method wherein sand coated with novolak-type phenolic resin and hexamethylene tetramine is thermo-set, the shakeout characteristic of sand cores is poor. Especially in the case of aluminum castings, the castings are often heat-treated (500° C.×1 to 4 hours) in an oven to strip off the core sand.

SUMMARY OF THE INVENTION

The present invention provides a novel binder composition which solves the above described problems.

In accordance with the present invention, there is provided a binder composition for foundry sand molds or cores comprising:

(a) component (a) which is an organic polyisocyanate compound; and (b) component (b) which is a compound selected from the group consisting of: (i) a polyol compound obtained by the reaction of formaldehyde with a compound selected from a bisphenol, a cyclic ketone in which both of the carbon atoms adjacent to the carbonyl group have a total of at least two hydrogen atoms, and mixtures thereof, and (ii) a derivative of the polyol compound (i) which is a reaction product of the polyol compound (i) and a monohydric alcohol, wherein the ratio of the component (a) to the component (b) is such that the isocyanate group of the component (a) is present in the range of 0.3 to 3 equivalents per equivalent of the hydroxyl group of the component (b) and the degree of alkoxylation of the methylol groups of the component (ii) is 10% to 60%.

The binder composition of the present invention is generally characterized by high strength of cured sands, rapid setting, good shakeout characteristic of sand cores at the time when castings are taken out, and other desirable characteristics. The binder composition of this invention can be used for sand molds and cores for cast iron and cast steel and is especially suitable for the binder composition for casting light alloys or metal materials such as aluminum.

More particularly, the present binder composition is characterized in that it (1) affords excellent shakeout characteristic of sand molds (especially sand-stripping property of foundry sand cores) at the time of shake out of castings, (2) makes possible control of the degree of heat resistance, (3) affords rapid-setting velocity in the cold box method and the self-setting method, and (4) affords a high set strength. The present binder composition can be used for cast iron and cast steel, is suitable for casting copper alloys and light alloys, and is especially suitable for casting light alloys or metal materials such as aluminum.

DETAILED DESCRIPTION OF THE INVENTION

Component (a)—Organic polyisocyanate

The organic polyisocyanate compound of the component (a) can be suitably selected from the organic polyisocyanate compounds which are widely used as the materials for preparation of polyurethane. Di- or triisocyanate compounds are preferred for the present invention. Tetra to hexa isocyanate compounds can also be used.

Examples of suitable organic polyisocyanate compounds include aliphatic polyisocyanates such as hexamethylene diisocyanate; and alicyclic polyisocyanates such as 4,4'-dicyclohexylmethane diisocyanate and isophorone diisocyanate; aromatic polyisocyanates wherein NCO groups are bonded to the aromatic ring, such as 2,4- and 2,6-tolylene diisocyanate, diphenylmethane diisocyanate, triphenylmethane triisocyanate, 1,5-naphthalene diisocyanate, polymethylene polyphenyleneisocyanates, chlorophenylene-2,4-diisocyanate, and xylylene diisocyanate and methyl derivatives thereof. Of such polyisocyanates, aromatic polyisocyanates are preferred. It is especially preferable to use diphenylmethane diisocyanate, triphenylmethane triisocyanate and mixtures thereof. These organic polyisocyanate compounds may also be used in a solution in aromatic hydrocarbons such as toluene, xylene, ethylbenzene, diethylbenzene, cumene, diisopropylbenzene, and by-product heavy oils obtained from the processes for preparation of ethylbenzene and cumene. Small amount of a polar solvent, such as ethylcellosolve acetate, isophorone, cyclohexanone, or 3-methoxy-butyl acetate, can be added to polyisocyanate solution to improve compatibility between polyisocyanate solution and polyol solution.

Component (b)—Polyol compounds

The component (b), which is used to form polyurethane by reaction thereof with the organic polyisocyanate compound and to harden foundry sands, is a polyol compound obtained by reacting a bisphenol and/or a certain cyclic ketone with formaldehyde, or the alkoxylated derivative thereof. Of these compounds, the most preferred are reaction products of mixtures of bisphenols and cyclic ketones with formaldehyde and the alkoxylated derivatives thereof. The reaction products of bisphenols with formaldehyde and the alkoxylated derivatives thereof are next preferred.

Bisphenols are exemplified by Bisphenol A, Bisphenol F, Bisphenol C, Bisphenol H and the like. As is well known, Bisphenol A is a dihydric phenol obtained by condensation of phenol and acetone, that is, 2,2-bis(4-hydroxyphenyl)propane; Bisphenol F is the corresponding compound obtained by using formaldehyde instead of the above mentioned acetone; Bisphenol C is the compound obtained by using cyclohexanone instead of the acetone; and Bisphenol H is a dihydric phenol obtained by condensation of o-tert-butyl phenol and acetone. These bisphenols can be used concomitantly.

Other compounds which are subjected to reaction with formaldehyde to form polyol compounds are the specified cyclic ketones, i.e., cyclic ketones wherein both the carbon atoms adjacent to carbonyl group have a total of at least two hydrogen atoms. The cyclic structure of the ketone containing carbonyl carbon is generally composed of a five- or six-membered ring, and can have one or more ethylenically unsaturated bonds and/or methyl substituents. In any case, a total of at least two hydrogen atoms should be present in both the carbon atoms adjacent to the carbonyl group. Examples of such cyclic ketones are cyclopentanone, methylcyclopentanone, cyclohexanone, methylcyclohexanone, isophorone, camphor and the like. Especially preferred is cyclohexanone. These ketones can be used concomitantly.

As formaldehyde sources, aqueous formalin solution, paraformaldehyde, trioxane and the like can be used.

Methylolation

The embodiment wherein the component (b) is a polyol compound obtained by the reaction of a bisphenol with formaldehyde is one of the preferable embodiments of present invention.

The reaction of a bisphenol with formaldehyde is generally carried out in the presence of a metal naphthenate or carboxylate catalyst such as zinc naphthenate, lead naphthenate or potassium acetate or an alkali catalyst such as sodium hydroxide at a temperature of from room temperature to 150° C. and preferably 60° C. to 120° C. The reaction can be carried out in the presence of water or another suitable solvent or dispersion medium (as detailed below).

When the reaction temperature is higher than the above defined range, the molecular weight of the resulting condensation product is undesirably increased by the formation of methylene ether bonding due to dehydration condensation between methylol groups added to the bisphenol molecules, or the formation of methylene bonding due to dehydration condensation or deformaldehyde condensation, or the like.

A suitable molar ratio of a bisphenol to formaldehyde is stoichiometrically in the range of 1:1 to 4 and preferably 1:1 to 2. The reaction can be actually carried out with a suitable quantity of formaldehyde less or greater than the stoichiometric quantity thereof.

The resulting polyol compound is essentially of a structure wherein methylol groups are added to the bisphenol molecule, but partly-condensed compounds thereof having 4 or 6 benzene rings may also produced.

The reaction of the cyclic ketone with formaldehyde is generally carried out in the presence of a basic or weakly-basic catalyst or a metal salt catalyst such as a divalent metal naphthenate or carboxylate at a temperature in the range of room temperature to 150° C. Especially suitable catalysts to be used herein are naphthenates or carboxylates of metals such as lead, calcium, zinc, tin, copper, magnesium, sodium and potassium. The reaction can be carried out in the presence of water or another suitable solvent or dispersion medium (as detailed below).

The molar ratio of a cyclic ketone to formaldehyde is, stoichiometrically, in the range of from 2 mols of formaldehyde to "the number of hydrogen atoms bonded to carbon atoms adjacent to the carbonyl group of the ketone" per mol of the ketone. Actually, the reaction can be carried out with a suitable quantity of formaldehyde less or greater than the stoichiometric quantity thereof.

The resulting polyol compound is essentially of a structure wherein two or more methylol groups are added to the carbon atoms adjacent to the carbonyl group of the ketone, and some polymeric compounds oligomerized by dehydration condensation between methylol groups and the like are also contained. Compounds wherein the carbonyl group thereof has been partly reduced or oxidized can also be formed.

Co-methylolation

The reaction of a mixture of a bisphenol and a cyclic ketone with formaldehyde, which provides another preferred embodiment of the present invention, is generally carried out in the presence of a metal naphthenate or carboxylate catalyst such as zinc naphthenate, lead naphthenate or potassium acetate or an alkali catalyst such as sodium hydroxide at a temperature in the range of room temperature to 150° C., preferably 50° to 130° C., for 1 to 7 hours. Thereafter water and the unreacted cyclic ketone in the reaction system are removed under reduced pressure. The reaction can be carried out in the presence of water or another suitable solvent or dispersion medium (as detailed below).

When the reaction is carried out in a non-aqueous solution with the use of a metal naphthenate catalyst and paraformaldehyde, the reaction temperature is in the range of 70° to 140° C., preferably 80° to 130° C. When the reaction is carried out with the use of aqueous formalin solution and an alkali catalyst, the reaction temperature is in the range of 40° to 95° C., preferably 50° C. to 80° C. In the above described reactions, the reaction temperatures outside of the above-defined ranges are undesirable. When the reaction temperature is excessively low, unreacted formalin is apt to remain. On the other hand, when the reaction temperature is excessively high, the resulting methylolated cyclic ketone and methylolated bisphenol react further to undergo a dehydration reaction between these methylolated compounds. As a result, poly-ring compounds are essentially produced.

The molar ratio of a bisphenol to a cyclic ketone in the above described reactions is in the range of 10/1 to 1/5, preferably 5/1 to ⅓.

The quantity of formaldehyde subjected to reaction is 0.3 or more, preferably 1.0 to 4.0, in terms of molar ratio to the bisphenol. The molar ratio of formaldehyde to a mixture of a bisphenol and a cyclic ketone is preferably 0.2 or more, especially 0.3 to 2.0.

The polyol compound product obtained in the above described reaction comprises methylolated compounds of bisphenol and of the cyclic ketone, and oligomers derived from partial dehydration condensation of each or both of the methylolated compounds. The polyol compound product may also contain a reaction product wherein the carbonyl group of the cyclic ketone has been partially reduced or oxidized.

Modification of methylol groups

In another embodiment of the present invention, the component (b) comprises the reaction product with an alcohol of the polyol compound product obtained by the reaction of bisphenols with formaldehyde, namely an alkoxylate.

The methylolation reaction (including the co-methylolation) is carried out as described above, and is described more specifically hereinbelow. The following processes for methylolation reaction can be applied to the above mentioned methylolation and co-methylolation provided that there is no adverse effect.

In the reaction of a bisphenol such as Bisphenol A or Bisphenol H with paraformaldehyde in the presence of a metal naphthenate catalyst such as lead naphthenate, the bisphenol and paraformaldehyde are dissolved in a polar solvent such as ethyleneglycol diacetate, methyl isobutyl ketone, acetone, acetophenone, cyclohexanone, isophorone, phenol, or dioxane, and the resulting mixture is subjected to reaction at a temperature of 70° to 130° C. In a reaction wherein an alkali catalyst such as sodium hydroxide is used, the bisphenol and an aqueous formalin (e.g., of a concentration of 37% by weight) are used, and the mixture is subjected to reaction at a temperature of 40° to 80° C. for 2 to 8 hours, this reaction being followed by adjustment of the pH of the reaction system to 3 to 6 by addition of phosphoric acid, oxalic acid, sulfuric acid or the like. Most of the water is then removed from the system under reduced pressure to obtain the corresponding compound having a methylol group.

A compound having a methylol group thus prepared is mixed with a certain alcohol, and the pH of the system is adjusted to a pH of 4 to 8, and this mixture is then caused to react at a temperature of 60° to 120° C. This reaction is generally caused to proceed by distilling away water produced in the reaction system. The preferred component (b) of the present invention is thus obtained.

The particular alcohols to be used in the present invention are represented by monohydric alcohols, and include fatty alcohols having 1 to 6, preferably 1 to 4 carbon atoms such as methanol, ethanol, n-propanol, isopropanol, n-butanol, isobutanol, n-pentanol, isopentanol, n-hexanol and isohexanol; benzyl alcohol; furfuryl alcohol and the like. About 0.5 to 5-fold mols of the alcohol on the basis of the methylol group are added to the compound having the methylol group for reaction.

After completion of the reaction, the unreacted alcohol is recovered.

A preferred mode of the reaction for preparation of the present component (b) is an alkoxylation reaction of the compound having methylol groups with the above-mentioned alcohol. In this case, methylene ether reaction and methylenation (methylene-forming) reaction also take place. Thus, the resulting product is a mixture of these reaction products. The solubility of the resulting component (b) in an organic solvent usable in the present composition is enhanced, since the methylol group providing water solubility is converted to the alkoxyl group which is oil soluble.

The reaction of a bisphenol with formaldehyde is generally carried out in a molar ratio of 1:1 to 4. If desired, the reaction can be carried out with a quantity of formaldehyde less or greater than the above defined range.

For casting a light alloy such an aluminum alloy at a relatively low temperature, the component (b) having about 0.3 to 2.0 mols of formaldehyde per mol of a bisphenol, which is to be reacted with an organic polyisocyanate compound, provides an excellent balance between heat resistance at the time of casting and breakability of used sand molds.

On the other hand, for casting cast iron or cast steel at a relatively high temperature, a component (b) having a molar ratio of about 1.5 to 4.0 of formaldehyde provides an excellent balance as mentioned above. In the case where the above mentioned molar ratio of formaldehyde is too high or where the preferred component (b) of the present invention is prepared under a certain reaction condition, the compatibility of the resulting component (b) with an organic polyisocyanate compound becomes lower and results in lower initial strength at the time of foundry molding by the cold box method.

The alkoxylation of the compounds having methylol groups in the present invention is especially effective when the molar ratio of the formaldehyde to the bisphenol is 1.5 or more. The number of methylol groups contained in the polyol compound can be controlled to a desired value. A polyol compound having a molar ratio of less than 1.5 may also be alkoxylated. In general, the preferable degree of alkoxylation of the methylol groups is 10% to 60%. The alkoxylation of the methylol groups can improve a compatibility of the component (i) of (b) with component (a).

Any of the component (b) is generally dissolved in a solvent and used in an amount and at a viscosity such that it will readily mix with the component (a) and the sand. The solvent to be used is a polar solvent such as ethylcellosolve acetate, ethyleneglycol diacetate, triethyleneglycol diacetate, isophorone, acetophenone, methyl isobutyl ketone, cyclohexanone, or 3-methoxybutyl acetate. An aromatic hydrocarbon such as xylene, cumene and diisopropyl benzene can also be used in combination with the above mentioned polar solvent.

Preparation of binder compositions

The binder composition of the present invention comprises the above-mentioned component (a) and component (b).

The composition can contain the above described solvent or diluent, and of course can also be used together with the polyol compound other than the component (b), such as a polyether polyol, a bisphenol and an alkyl resorcine. It is to be noted that the present binder composition has satisfactory heat resistance for casting a light alloy or metal material such as aluminum. For casting iron, steel or the like at a higher temperature, however, a certain polyol compound such as novolac phenol resin, resol phenol resin or benzylic ether-type phenol resin can also be added thereto in order to increase the heat resistance at the time of casting molten metal.

When no polyol compound other than the component (b) is used, it is suitable to combine the components (a) and (b) in a ratio of 0.3 to 3 equivalent and preferably 0.6 to 1.5 equivalents of the isocyanate group of the component (a) to 1 equivalent of the hydroxyl group of the component (b).

When the component (b) is used together with any of other polyol compounds, it is suitable to combine these components in a ratio of 0.3 to 3 equivalents and preferably 0.6 to 1.5 equivalents of the isocyanate group of the component (a) to 1 equivalent of the total hydroxyl groups of the component (b) and the other polyol.

The component (a) and the component (b) and the other polyol compound used if desired are combined in a quantity of 0.5 to 5 parts by weight to 100 parts by weight of the foundry sand.

If desired, a silane compound such as $\gamma$-aminopropylethoxysilane, N-$\beta$-(aminoethyl)-$\gamma$-aminopropyltrimethoxysilane, or $\gamma$-mercaptopropyltrimethoxysilane can be added to enhance the moisture resistance of the binder in a quantity of 0.005 to 0.5 part by weight to 100 parts by weight of the total of the component (a) and the component (b).

Compositions for foundry sand molds and cores

The present composition is used in admixture with foundry sand. The foundry sand can be any of the sands or inorganic powders which have been used for castings, the particle sizes and types of which can be appropriately selected.

When a sand mold is made at room temperature from the foundry sand mixed with the present binder composition, the molded sand can be set rapidly by the addition of a catalyst to rapidly exhibit the strength of the resulting mold (no-bake process). The catalysts to be used include metal salts such as cobalt naphthenate, tin octoate or dibutyl tin dilaurate, and tertiary amines such as N-ethyl morpholine, ethyl morpholinopropionate, tetramethyldiaminopropane, triethylenediamine or 4-phenylpropylpridine, and the like.

The quantity of the catalyst to be used is suitably not more than 5 parts by weight to 100 parts by weight of the total of the component (a) and the component (b) including the polyol compounds.

Alternatively, the sand molds and cores can be made by uniformly mixing the foundry sand and present binder composition, filling a mold with the mixture, and then contacting the molded sand with an amine-containing gas to effect rapid setting (cold box process). In this case, the amines preferred for use for the catalyst are tertiary amines, and especially, trimethylamine, triethylamine, dimethylethylamine, dimethylethanol amine, N-ethylmorpholine and the like.

These tertiary amines are introduced into the mold normally at a concentration of not higher than about 5% by volume by using as carrier gas an inactive gas such as nitrogen or air.

In order to indicate more fully the nature and utility of this invention, the following specific examples of practice thereof are set forth, it being understood that these examples are presented as illustrative only and that they are not intended to limit the scope of the invention.

Throughout these examples quantities expressed in "part" and "percent" are by weight.

REFERENCE EXAMPLE A-1

Preparation of a polyol compound:

A 1-liter 4-necked flask was charged with 228.3 g (1 mol) of Bisphenol A, 60 g of paraformaldehyde, 230 g of ethyleneglycol diacetate and 3.0 g of lead naphthenate. These materials were caused to react at 110° C. for 3 hours with stirring. Unreacted formaldehyde was removed under reduced pressure. The reaction mixture was cooled at room temperature. From an analysis by means of GPC, IR and NMR, it was found that the resulting product was a mixture of polyol compounds containing the Bisphenol A derivative having a methylol group as the main component.

EXAMPLE A-1

To 100 parts of Ayaragi silica sand No. 6 were added 0.95 part of the polyol compound solution obtained in the above Reference Example A-1 and 0.10 part of a 10% N-ethylmorpholine solution in ethylcellosolve acetate, these materials being mixed uniformly. To the mixture was then added 1.05 parts of a 66% diisopropylbenzene solution of polymeric polyisocyanate (a mixture of diphenylmethane diisocyanate and triphenylmethane triisocyanate). The resulting mixture was mixed uniformly and placed in a cylindrical metal mold, 5 cm in diameter by 13 cm in height, to a depth of 5 cm, and was then tamped by a standard tamping tester to make test pieces. The compressive strength of each sample thus obtained was determined at predetermined time intervals. The results are shown in the following table.

| Time(hr) | ¼ | ½ | 1 | 3 | 24 |
|---|---|---|---|---|---|
| Compressive strength (Kg/cm$^2$G) | 22.4 | 36.4 | 46.6 | 49.5 | 59.1 |

A sand mold and core for car-cooler cases was made from the same foundry sand composition. The sand and core mold was taken out 15 minutes after molding. After 3 hours, molten aluminum at 760° C. was poured into the sand mold. When the casting was taken out after cooling, the shakeout characteristic of the sand mold and the foundry sand core was found to be good. A casting having a beautiful cast surface was obtained.

EXAMPLE A-2

To 100 parts of Ayaragi silica sand No. 6 was added 0.95 part of the polyol compound solution obtained in Reference Example A-1, and these materials were mixed uniformly. The mixture was admixed with 1.05 parts of a 66% diisopropylbenzene solution of a polymeric polyisocyanate and then mixed uniformly. A sand mold for a car-cooler case was made from the resulting foundry sand composition and was set by passing therethrough for 30 seconds a triethylamine-containing gas which has been vaporized by bubbling nitrogen therein to. Molten aluminum at 760° C. was poured into the sand mold. When the casting was taken out after cooling, the shakeout characteristic of the sand mold and especially that of the foundry sand core were found to be good. A casting having a beautiful casting surface was obtained.

The same foundry sand composition was placed in a cylindrical metal mold, 5 cm in diameter by 13 cm in height, and tamped to a depth of 5 cm by a standard tamping tester. The sand test piece was then set by passing therethrough for 10 seconds a triethylamine-containing nitrogen. The compressive strength of the set foundry sand test piece was 33.9 Kg/cm$^2$G immediately after it was taken out of the mold and 50.2 Kg/cm$^2$G one hour thereafter.

REFERENCE EXAMPLE B-1

Preparation of a polyol compound:

A 4-necked flask with a stirrer was charged with 230 g of cyclohexanone, 140.4 g of paraformaldehyde and 3.0 g of zinc naphthenate, and the mixture was subjected to reaction at 120° C. for 4 hours. The temperature inside of the flask was lowered to 100° C., and unreacted cyclohexanone and water were removed under a reduced pressure of 20 mmHg to obtain a polyol compound (hereinafter refered to as Polyol BA).

REFERENCE EXAMPLE B-2

Preparation of a polyol compound:

A 4-necked flask with a stirrer was charged with 115 g of cyclohexanone, 70.2 g of paraformaldehyde, 90 g of ethyleneglycol diacetate and 1.5 g of lead naphthenate, and the mixture was caused to react at 120° C. for 4 hours. The temperature inside of the flask was then lowered to 100° C. The reaction mixture was dehydrated under a reduced pressure of 40 mmHg to obtain a polyol compound solution (hereinafter referred to as Polyol BB).

EXAMPLE B-1

The Polyol BA in a quantity of 100 g was mixed with 50 g of ethyleneglycol diacetate and was uniformly dissolved therein. The resulting solution (9.5 parts) was added to 1,000 parts of Ayaragi silica sand No. 6, and the mixture was mixed uniformly. To this mixture was further added 10.5 parts of a solution consisting of 90 parts of a commercially available polymethylene polyisocyanate (a mixture of diphenylmethane diisocyanate and triphenylmethane triisocyanate produced by Kasei Upjohn K. K., Japan) and 10 parts of diisopropylbenzene. The resulting mixture was mixed uniformly.

The resulting foundry sand composition was placed in a cylindrical metal mold, 5 cm in diameter by 13 cm in height, and tamped to a depth of 5 cm by a standard tamping tester. The tamped structure was then contacted for 15 seconds with a triethylamine-containing nitrogen gas. The compressive strength of the resulting foundry sand test piece was 27.6 Kg/cm$^2$G immediately after it was taken out of the mold, and 39.7 Kg/cm$^2$G one hour thereafter.

A sand mold and core for a car-cooler case was made from the same foundry sand composition and then was set by passing therethrough for 30 seconds a triethylamine-containing gas which had been vaporized by bubbling nitrogen thereinto. Molten aluminum at 760° C. was poured into the sand mold. The shakeout characteristic of the sand core was found to be good when the casting was taken out after cooling. A casting having a beautiful cast surface was obtained.

EXAMPLE B-2

The solution of the polyol BB (10.0 parts) obtained in Reference Example B-2 and 1.0 part of N-ethylmorpholine (a concentration of 30%) dissolved in ethylcellosolve acetate were added to and mixed uniformly with 1,000 parts of Ayaragi silica sand. To this mixture was further added 10.0 parts of commercially available polymethylene polyisocyanate, and the resulting mixture was mixed uniformly. The resulting foundry sand composition was placed in a cylindrical metal mold, 5 cm in diameter by 13 cm in height, and tamped to a depth of 5 cm by a standard tamping tester to form test pieces. The compressive strength of some of these test pieces was 12.3 Kg/cm$^2$G one hour after the forming, and those of others was 38.0 Kg/cm$^2$G one day thereafter.

EXAMPLE B-3

Ten (10) parts of the polyol BA, 10 parts of Bisphenol A and 10 parts of ethyleneglycol diacetate were mixed and dissolved uniformly. To 1,000 parts of Ayaragi silica sand No. 6 was added 8.4 parts of the resulting solution. This step was followed by uniform mixing. To this mixture was further added 11.6 parts of a solution consisting of 70 parts of a commercially available polymethylenepolyisocyanate and 30 parts of diisopropyl benzene, and the resulting mixture was mixed uniformly.

The resulting foundry sand composition was placed in a cylindrical metal mold, 5 cm in diameter by 13 cm in height, tamped to a depth of 5 cm by a standard tamping tester, and then contacted for 15 seconds with a triethylamine-containing nitrogen gas. The compressive strength of the structure thus obtained was then determined.

The compressive strength of the resulting test pieces was found to be 51.5 Kg/cm$^2$G immediately after they were taken out of the mold and 57.4 Kg/cm$^2$G 30 minutes thereafter.

A sand mold and core for a car-cooler case was made from the same foundry sand composition and then was set by passing therethrough for 30 second triethylamine-containing nitrogen. Molten aluminum alloy at 760° C. was poured into the sand mold. The shakeout characteristic of the sand core when the casting was taken out after cooling was good. A casting having a beautiful cast surface was obtained.

REFERENCE EXAMPLE C-1

Preparation of a polyol compound:

A 4-necked flask with a stirrer was charged with 98.2 g (1 mol) of cyclohexanone, 228.3 g (1 mol) of Bisphenol A, 75.0 g of paraformaldehyde and 2.0 g of zinc naphtenate. The mixture was reacted at 120° C. for 4 hours.

The temperature within the flask was then lowered to 100° C. Unreacted cyclohexanone and water were removed under a reduced pressure of 20 mmHg. To the reaction system was added 350 g of ethyleneglycol diacetate, and the mixture was uniformly dissolved to obtain a solution of a polyol compound (hereinafter referred to as polyol CA). The product was analyzed by means of GPC, IR and NMR. As a result, it was confirmed that the polyol CA comprised methylolated Bisphenol A and cyclohexanone and condensed products of each or both of them.

REFERENCE EXAMPLE C-2

Preparation of a polyol compound:

A 4-necked flask with a stirrer was charged with 228 g (2.33 mols) of cyclohexaneone, 228.3 g (1 mol) of Bisphenol A, 65 g of paraformaldehyde and 3.0 g of zinc naphthenate, which were caused to react at 100° C. for 4 hours.

Water and 120 g of unreacted cyclohexanone were removed under a reduced pressure at 100° C. To the resulting system were added 120 g of 3-methoxy-butyl acetate and 90 g of isopropylbenzene. The mixture was uniformly dissolved and cooled to room temperature to obtain a solution of a polyol compound (hereinafter referred to as polyol CB).

The resulting polyol CB was confirmed to be the component (b) of the present invention by analysis thereof in the same manner as in Reference Example C-1.

REFERENCE EXAMPLE C-3

Preparation of a polyol compound:

Reference Example C-2 was repeated except that the reaction was carried out for 5 hours with the use of 98.2 g (1 mol) of cyclohexanone.

Water and 45 g of unreacted cyclohexanone were then removed at the same temperature under a reduced pressure. To the reaction system were added 133 g of 3-methoxybutyl acetate and 70 g of an aromatic ($C_9$- and heavier) fraction produced in an aromatics plant. The mixture was uniformly dissolved and cooled to room temperature to obtain a solution of a polyol compound (hereinafter referred to as polyol CC).

The resulting polyol CC was confirmed to be the component (b) of the present invention by analysis thereof in the same way as in Reference Example C-1.

EXAMPLE C-1

To 1,000 parts of Ayaragi silica sand No. 6 was added 9.6 parts of the polyol CA solution obtained in Reference Example C-1, and the mixture was mixed uniformly. To the mixture was further added 10.5 parts of a solution consisting of 70 parts of a commercially available polymethylenepolyisocyanate and 30 parts of diisopropylbenzene, the resulting mixture being mixed uniformly.

The resulting foundry sand composition was placed in a cylindrical metal mold, 5 cm in diameter by 13 cm in height, tamped to a depth of 5 cm by a standard tamping tester, and then contacted for 15 seconds with triethylamine-containing nitrogen gas. The compressive strength of the resulting foundry sand test pieces was 43.6 Kg/cm²G immediately after they were taken out of the mold and 47.2 Kg/cm²G one hour thereafter.

A sand mold and core for a car-cooler case was made from the same foundry sand composition and was set by passing therethrough for 30 seconds triethylamine-containing nitrogen. Molten aluminum alloy at 760° C. was poured into the sand mold.

The shakeout characteristic of the sand core when the casting was taken out after cooling was good. A cast product having a beautiful cast surface was obtained.

EXAMPLE C-2

Example C-1 was repeated to prepare a foundry sand composition except that was made of 10.0 parts of the polyol CB obtained in Reference Example C-2 and, as the component (a) of the present invention, 10.0 parts of a mixed solution consisting of 75% of PAPI-135 (a mixture of diphenylmethane diisocyanate and triphenylmethane triisocyanate) produced by Kasei Upjohn K.K., Japan, 22.5% of diisopropylbenzene and 2.5% of 3-methoxy-butyl acetate. Foundry sand test pieces were made from the composition. The compressive strength of the test pieces was 43.1 Kg/cm² immediately after they were taken out of the mold, 58.3 Kg/cm² one hour thereafter, and 61.3 Kg/cm² one day thereafter, respectively. The test piece allowed to stand for one day was placed for 2 minutes in an electric oven heated to 700° C. The compressive strength of the piece immediately after it was taken out of the oven was 3.8 Kg/cm².

A wooden core pattern for an intake manifold of a motor vehicle was filled with the same foundry sand composition, which was set by passing therethrough for 30 seconds a triethylamine-containing gas which had been vaporized by bubbling nitrogen. The resulting foundry sand core was placed in a metallic mold for the intake manifold, and molten aluminum at 760° C. was poured into the mold. The sand-stripping of the sand core from the cooled casting was readily accomplished by tapping it with a resin hammer. The casting defects such as wash and sand inclusion were not observed.

EXAMPLE C-3

To 1,000 parts of Ayaragi silica sand No. 6 were added 10.0 parts of the polyol CC obtained in Reference Example C-3 and 1.0 part of a 30% cellosolve acetate solution of N-ethylmorpholine, and the mixture was mixed uniformly.

To this mixture was added 10.0 parts of a solution consisting of 70% of a polymeric polyisocyanate (a mixture of diphenylmethane diisocyanate and triphenylmethane triisocyanate), 26% of diisopropylbenzene and 4% of 3-methoxy-butyl acetate, and the resulting mixture was mixed uniformly. A 6-piece-composite wooden pattern having a space of 5 cm in diameter and 5 cm in height was rapidly filled with the resulting foundry sand composition. The foundry sand test pieces thus formed were taken out after specific times and subjected to compressive strength tests. The results are shown in the following table.

| Time | after 10 minutes | after 15 minutes | after 1 hour | after 3 hours | after 1 day |
|---|---|---|---|---|---|
| Compressive strength (Kg/cm²) | 5.7 | 21.4 | 47.2 | 49.2 | 53.4 |

The test piece placed in the mold for 1 day was placed in an electric oven heated to 700° C. for 2 minutes. The compression strength immediately after it was taken out of the oven showed a high heat resistance of 15.4 Kg/cm².

The same foundry sand composition was charged into a wooden pattern mold for an intake manifold for trucks and taken out after 15 minutes. The resulting sand core was set in an outer mold formed with green sand. After 2 hours, molten aluminum at 760° C. was poured thereinto. The foundry sand mold was broken after 30 minutes. When the casting was taken out, no admixing of the core sand into the green sand of the outer mold was observed. The core sand stripping from the casting was easily accomplished by tapping it with a resin hammer 3 to 5 times.

EXAMPLE OF PREPARATION D-1

A 1-liter 4-necked flask was charged with 228.3 g (1.0 mol) of Bisphenol A, 162.2 g of 37% formalin solution (2.0 mols as formaldehyde) and 3.4 g of 20% aqueous solution of sodium hydroxide. The mixture was subjected to reaction with stirring at 60° C. for 4 hours. Then, 25% aqueous solution of phosphoric acid was added to the reaction system to adjust the pH thereof to 4.5. Most of the water in the reaction system was removed under reduced pressure. 161 g (2.2 mols) of n-butanol and 70 g of toluene were then added. The reaction was continued until the resulting water corresponding to 1.5 mols was removed as azeotrope.

The temperature of the reaction system was raised from 85° C. to 118° C. finally. Water, unreacted n-butanol and toluene were then removed at 110° C. under 20 mmHg. Then, 100 g of 3-methoxy-butyl acetate and 90 g of isopropyl benzene were added, and cooling was carried out to room temperature. Thus the polyol compound of the present invention was obtained. It has been confirmed by infrared absorption spectra and NMR spectra that the resulting polyol compound was a mixture of a methylolated product of Bisphenol A and the methylolated product wherein parts of the methylol groups were butoxylated, methylene-etherated and methylenated.

EXAMPLE OF PREPARATION D-2

The process of the Preparation Example D-1 was repeated, except that the butoxylation was not carried out, to obtain a solution of methylolated Bisphenol A in 3-methoxy-butyl acetate (130 g) and isopropylbenzene (60 g). The methylolated Bisphenol A was confirmed in the same way as in Example of Preparation D-1.

EXAMPLE OF PREPARATION D-3

A 1-liter 4-necked flask was charged with 228.3 g (1.0 mol) of Bisphenol A, 243.2 g of 37% aqueous solution of formalin (3.0 mols as formaldehyde) and 4.5 g of 20% aqueous solution of sodium hydroxide. The mixture was subjected to reaction with stirring at 60° C. for 4 hours. The reaction system was adjusted to a pH of 5 by adding thereto a 40% aqueous solution of oxalic acid. Most of the water was then removed from the reaction system under reduced pressure. Then, to the reaction system were added 296 g (4 mols) of n-butanol and 70 g of toluene. The mixture was caused to react until the resulting water corresponding to 2.0 mols was removed as azeotrope. The temperature of the reaction system was raised finally to 118° C. Then, water, unreacted butanol and toluene were removed at 110° C. under 20 mmHg. 100 g of 3-methoxy-butyl acetate and 90 g of isopropylbenzene were then added. This step was followed by cooling to room temperature. The polyol compound of the present component (b) was obtained.

EXAMPLE OF PREPARATION D-4

The process of Preparation Example D-3 was repeated, except that the butoxylation was not carried out, to obtain a solution of methylolated Bisphenol A in 3-methoxy-butyl acetate (150 g) and isopropylbenzene (40 g). The methylolated Bisphenol A was confirmed in the same way as in Example of Preparation D-1.

EXAMPLE OF PREPARATION D-5

A 1-liter 4-necked flask was charged with 228.3 g (1.0 mol) of Bisphenol A, 98.2 g (1.0 mol) of cyclohexanone, 88.2 g (2.5 mols) of paraformaldehyde and 3.0 g of lead naphthenate. The mixture was caused to react with stirring at 100° C. at 4 hours. To the reaction system were added 222 g (3.0 mols) of n-butanol and 1.2 g of oxalic acid. The water thus produced corresponding to 1.5 mols was removed as azeotrope. The temperature of the reaction system was raised to 120° C. Water, and unreacted n-butanol and cyclohexanone were then removed at 110° C. under 10 mmHg. Then 100 g of 3-methoxy-butyl acetate and 90 g of isopropylbenzene were added. The system was then cooled to room temperature. Thus the polyol compound of the present component (b) was obtained.

EXAMPLE OF PREPARATION D-6

The process of Preparation Example D-5 was repeated, except that the butoxylation was not carried out, to obtain a solution of a polyol compound in 3-methoxy-butyl acetate (100 g) and isopropylbenzene (90 g).

EXAMPLES D-1 THROUGH D-3 AND REF. EXAMPLES D-1 THROUGH D-3

To 100 parts of Ayaragi silica sand was added 0.95 part each of the polyol compound solution obtained by Examples of Preparation D-1 through D-6, respectively. The mixture was uniformly mixed. 1.05 parts of 76% diisopropylbenzene solution of PAPI-135 produced by Kasei Upjohn K.K., Japan (a mixture of diphenylmethane diisocyanate and triphenylmethane triisocyanate) were then added, and the mixture was mixed uniformly. The resulting foundry sand composition was placed in a cylindrical metal mold 5 cm in diameter by 13 cm in height, tamped to a depth of 5 cm by a standard tamping tester, and set by passing therethrough for 10 seconds a triethylamine-containing nitrogen gas.

The compressive strength of the resulting foundry sand test pieces was measured immediately after it was taken out of the mold and 3 hours thereafter. The results are shown in the following table.

The superiority of the binders of the present invention is clearly shown by the table.

| | Examples | | | | | |
|---|---|---|---|---|---|---|
| | Ex. D-1 | Ref. Ex. D-1 | Ex. D-2 | Ref. Ex. D-2 | Ex. D-3 | Ref. Ex. D-3 |
| | Polyol compounds used | | | | | |
| Compressive strength | P. Ex.* D-1 | P. Ex. D-2 | P. Ex. D-3 | P. Ex. D-4 | P. Ex. D-5 | P. Ex. D-6 |
| Immediately after takeout (Kg/cm$^2$) | 43.1 | 29.8 | 39.4 | 17.6 | 36.3 | 24.6 |
| 3 hours thereafter (Kg/cm$^2$) | 67.3 | 53.7 | 58.3 | 47.6 | 70.1 | 48.9 |

Note:
*P. Ex. stands for Example of Preparation.

What is claimed is:
1. A binder composition for foundry sand molds or cores comprising:
   (a) component (a) which is an organic polyisocyanate compound; and
   (b) component (b) which is a compound selected from the group consisting of (i) a polyol compound obtained by the reaction of formaldehyde with a compound selected from bisphenols, cyclic ketones in each of which both of the carbon atoms adjacent to the carbonyl group have a total of at least two hydrogen atoms, and mixtures thereof, and (ii) a derivative of the polyol compound (i) which is a reaction product of a polyol compound (i) and a monohydric alcohol, wherein the quantitative ratio of the component (a) to the component (b) is such that the isocyanate group of the component (a) is present in the range of 0.3 to 3 equivalents per equivalent of the hydroxyl group of the component (b) and the degree of alkoxylation of the methylol groups of the component (ii) is 10% to 60%.

2. The composition according to claim 1, in which the organic polyisocyanate is an aromatic polyisocyanate having at least 2 NCO groups on the aromatic rings.

3. The composition according to claim 2, in which the aromatic polyisocyanate is selected from the group consisting of diphenylmethane diisocyanate, triphenylmethane triisocyanate and mixtures thereof.

4. The composition according to claim 1, in which the bisphenol is selected from the group consisting of Bisphenol A, Bisphenol F, Bisphenol C and Bisphenol H.

5. The composition according to claim 4, in which the bisphenol is Bisphenol A.

6. The composition according to claim 1, in which the cyclic ketone is selected from the group consisting of cyclopentanone, methylcyclopentanone, cyclohexanone, methylcyclohexanone, isophorone and camphor.

7. The composition according to claim 6, in which the cyclic ketone is cyclohexanone.

8. The composition according to any of claims 1 through 7, in which the component (b) is a polyol compound obtained by the reaction of the bisphenol with formaldehyde.

9. The composition according to any of claims 1 through 7, in which the component (b) is a polyol compound obtained by the reaction of a mixture of the bisphenol and the cyclic ketone in a molar ratio of 10/1 to 1/5 with formaldehyde.

10. The composition according to any of claims 1 through 7, in which the component (b) is an alkoxylated derivative of the polyol compound obtained by the reaction of the bisphenol with formaldehyde wherein a part of the methylol groups of the polyol compound was alkoxylated by the reaction with a monohydric alcohol.

11. The composition according to claim 10, in which the monohydric alcohol is an aliphatic alcohol having 1 to 6 carbon atoms.

* * * * *